United States Patent Office 2,983,751
Patented May 9, 1961

2,983,751

METHOD OF PREPARING ORGANIC DISULFIDES AND OMEGA-HALOGENATED CARBONYL COMPOUNDS

John B. Braunwarth, Crystal Lake, Ill., assignor to The Pure Oil Company, Chicago, Ill., a corporation of Ohio No Drawing. Filed July 29, 1957, Ser. No. 674,631

15 Claims. (Cl. 260—487)

This invention relates to a method of reacting alicyclic hydroperoxides, or peroxides of the general formula, (1) 

wherein Y is a substituent selected from the group of alkyl and alkoxy radicals containing from 1 to 6 carbon atoms and a hydroxyl group, and R is a divalent alkylene radical, as hereinafter defined, with sulfenyl halides of the general formula, (2) $R^1SX$ wherein $R^1$ is selected from the class consisting of hydrocarbon radicals of from 1 to 14 carbon atoms which are free from non-benzenoid unsaturation and which may contain substituents, such as chlorine, bromine, fluorine and nitro radicals, and X is a halogen selected from the group consisting of bromine, chlorine and iodine wherein, if a halogen is on the hydrocarbon radical, it is of lower or equivalent order of chemical activity as compared with X, the reaction being conducted under reduction-oxidation conditions at a temperature within the general limits of —40° C. to 40° C. and atmospheric pressures.

As a result of the foregoing reaction, depending upon whether Y is an alkyl group ($R^2$) or a hydroxyl group and the presence or absence of an esterifying agent in the form of an alcohol ($R^3OH$), which may also serve as a solvent for the reaction, compounds of the following general formulas are formed:

(3) $R^1S—SR^1$
disulfides (4) 
omega-halo-carboxylic acids (5) 
alkyl-omega-halo-esters (6) 

omega-halo-ketones wherein $R^2$, $OR^3$ and OH are Y of the original peroxide

It is known in the art to prepare perchlorodimethyl disulfide from trichloromethanesulfenyl chloride by using silver powder. Yields of only 10.8 mol percent are obtained by this method and it is only applicable to the dimethyl derivatives. In accordance with this invention, it has been found that alicyclic hydroperoxides or alicyclic peroxides react with sulfenyl halides in an acid-alcoholic or acid-aqueous solution in the presence of a reducing metallic compound to yield two major products, namely certain disulfides and omega-halogen-substituted carboxylic acids, and their esters and related ketones. The disulfides find use as intermediates in organic syntheses and the omega-halogen-substituted acids, already having one carboxyl group, are amenable to easy transformation into dibasic acids which are useful in manufacturing lubricating oils. Also, the alkyl omega-halogen-substituted esters that may be formed can be converted into compounds containing an ester linkage at one end of the molecule and a carboxyl group or an ester group at the other end of the molecule; as such, they are useful lubricating oil addends. However, the invention does not relate to the use of these products, but is concerned with their preparation. A preferred embodiment of the invention comprises the reaction of alicyclic peroxides with sulfenyl halides under redox conditions to form dialkyl disulfides and omega-halogen-substituted acids, esters and related ketones.

Accordingly, it becomes a primary object of this invention to provide a method for the preparation of organic disulfides and omega-halogen-substituted acids, esters and related ketones through the reaction of alicyclic hydroperoxides or peroxides and sulfenyl halides under reduction oxidation conditions.

Another object of this invention is to provide a method for the formation of organic disulfides by the reaction of certain sulfenyl halides with an alicyclic hydroperoxide or peroxide in the presence of a metal salt having the metal in a lower valence state.

Another object of the invention is to provide a method for the preparation of substituted organic disulfides.

An object of the invention is to provide a method of preparing omega-halogen-substituted carboxylic acids, their esters and related ketones.

An object of the invention is to provide a method of preparing perchlorodialkyl disulfides.

Another object of the invention is to provide a method of preparing di(nitrophenyl) disulfides.

Still a further object of the invention is to provide a method for the preparation of perchlorodimethyl disulfide and omega-chloro-substituted carboxylic acids and esters which are useful intermediates in the preparation of organic compounds, particularly dibasic acids and their esters, which are advantageous in lubricating oil compositions.

THE PEROXIDE REACTANT

The term "peroxide" or "peroxide compound" as used herein is intended to broadly cover compounds of Formula (1), and includes compounds that in a strict sense are defined as hydroperoxides. The preferred starting materials are peroxides (and hydroperoxides) of the type obtainable by reacting oxygen or hydrogen peroxide with cycloalkanols or cycloalkanones in accordance with the following equations:

(7) 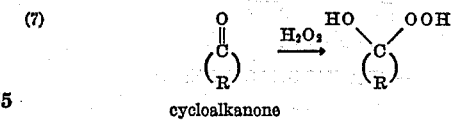
cycloalkanone (8) 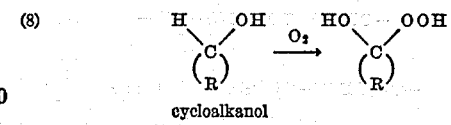
cycloalkanol (9) 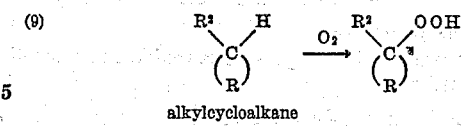
alkylcycloalkane

(10) 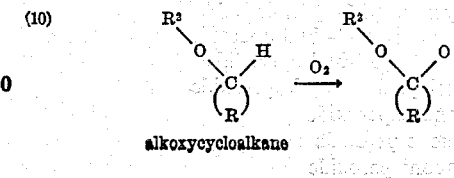
alkoxycycloalkane

Reactions 7, 8, 9, and 10 are well known in the art and no further description is necessary. The reaction products are available commercially and fall under the general formula,

(11)
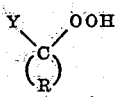

wherein Y is a substituent selected from the group of alkyl and alkoxy radicals containing 1 to 6 carbon atoms and a hydroxyl group. R in the above formula is a divalent alkylene radical having as its essential part a chain of from three to seven carbon atoms connected with the carbon atoms shown so as to form a skeletal ring of four to eight carbon atoms. This radical may carry various substituents, or functional groups, such as alkyl, aryl, arylalkyl, alicyclic, heterocyclic and organic groups, including methyl, ethyl, propyl, butyl, benzyl, phenyl, cyclohexyl, halo, such as chloro, bromo, and fluoro, hydroxy, methoxy, carboxy, and/or may contain one or more double bonds, or a phenylene or cyclohexylene group.

Examples of R-groups contained in the primary ring structures in Formula 1 or 10 include

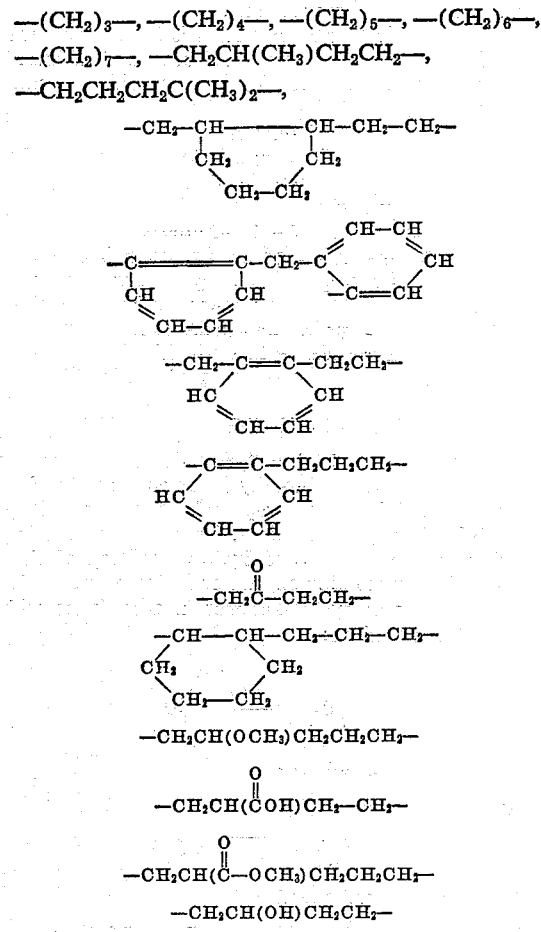

and similar structures.

Specific preferred examples of peroxide reactants that may be used are:

1-methylcyclopentyl-1-hydroperoxide
1-methylcyclohexyl-1-hydroperoxide
1-methylcycloheptyl-1- hydroperoxide
1-ethylcyclopentyl-1-hydroperoxide
1-propylcyclopentyl-1-hydroperoxide
cyclopentanone peroxide
cyclohexanone peroxide
cycloheptanone peroxide
cyclobutanone peroxide
2-methylcyclobutanone peroxide

THE SULFENYL HALIDES

The sulfenyl halides used to carry out the invention have the general formula

(12) $R^1SX$ wherein $R^1$ represents substituted and unsubstitued hydrocarbon radicals of from 1 to 14 carbon atoms which are free from non-benzenoid unsaturation, and which may have substituents such as nitro, chlorine, bromine and fluorine, and X is a halogen selected from the group consisting of bromine, chlorine, and iodine. These compounds are further defined by the stipulation that X is of equal or higher chemical activity than any substituent in $R^1$. Since the reaction involved is one of breaking a C—C linkage in the alicyclic hydroperoxide with the loss of one halogen atom from the sulfenyl halide group, this halogen atom must be more easily replaced than any halogen present on the hydrocarbon portion of the molecule. As is known, the affinity of the halogens for an extra electron to form a halogen ion is greatest for fluorine and least for iodine, with chlorine ranking second in activity and bromine third. The opposite is true during replacement of a halogen, that is fluorine is the least reactive and iodine the most reactive. In addition, not all of the sulfenyl halides containing all of the different combinations of halides possible for $R^1$ and X in Formula 12 are known or available commercially. The limitations defined herein accordingly cover those compounds which are known or can be prepared and which will react to give economical yields without profuse side reactions, such as reactions involving the substituted hydrocarbon portion of the molecule. Following the foregoing, three possibilities present themselves: (1) Where there is no halogen substitution on the hydrocarbon portion, X may be chlorine, bromine, or iodine; (2) where the halogen is bromine in the halogen-substituted hydrocarbon, X may be bromine or iodine; and (3), where the halogen is chlorine or fluorine in the halogen-substituted hydrocarbon, X may be chlorine, bromine or iodine.

Examples of sulfenyl halides that may be used to carry out the reaction and which come within the foregoing definition are:

Trichloromethanesulfenyl chloride
2-nitrobenzenesulfenyl chloride
4-chloro-2-nitrobenzenesulfenyl chloride
2,3-,3,4- or 2,4-dichlorobenzenesulfenyl chloride
2-,3- or 4-fluorobenzenesulfenyl chloride
3-chlorocyclohexanesulfenyl chloride
Benzenesulfenyl chloride
Benzenesulfenyl bromide
Trimethylmethanesulfenyl chloride
1-anthraquinonesulfenyl bromide

THE REACTION CONDITIONS

The reaction of this invention employs reduction-oxidation conditions, same being essential to bring about the conversion as stated in the foregoing discussion. The term "redox" is used herein in its widely accepted sense to designate a reduction-oxidation environment wherein an electron transfer takes place with the simultaneous formation of a free radical. In order for this reaction to take place, it is necessary that there be present a substance or substances which act as a reducing agent for the peroxide compound. Salts of those heavy metals which are capable of existing in several valence states, such as iron, chromium, manganese, cobalt, copper and molybdenum, are among such suitable reducing agents. Certain organic and inorganic compounds such as sodium bisulfite, the reducing sugars, 1-ascorbic acid, sodium formaldehyde sulfoxylate and other known reducing agents of the redox art may also be used.

The general reaction conditions are —40° C. to 40° C. at atmospheric pressure. No particular manipulation is necessary in carrying out the reaction except to avoid premature oxidation of the reducing substance or substances used, and the general precautions known in the art in handling peroxides. Because the reaction is exothermic, more accurate temperature control, as by slow addition of the reducing substance, is necessary when operating at temperatures ranging from 10° C. to 40° C. Also, at temperatures below —25° C. the problem of reactant crystallization may become acute. As a consequence, temperatures between about 10° C. and —25° C. are preferred. It is advantageous to blanket the reaction system, which is preferably a closed vessel equipped with a stirring means, with an inert atmosphere, such as nitrogen. This prevents possible oxidation of the reducing agent, or change of the "ous" salt to "ic" form. The presence of a solvent aids in dilution of the reaction mixture so that temperature control is facilitated. Various known inert solvents may be used for this purpose, including ether, benzene, alcohol, etc. A necessary limitation in the choice of solvent is the stability of the sulfenyl halides, some of which undergo side reactions with solvents such as water and ketones. Perchloromethanesulfenyl chloride is stable in both water, and alcohol, but we found that the 2-nitrobenzenesulfenyl chloride undergoes a side reaction in the presence of water, or of large concentrations of alcohol or acid. Therefore, it was impossible to prepare this alkyl chloro-ester in the same way we did in the case of perchloromethanesulfenyl chloride. By use of an inert solvent, the omega-halogen-substituted carboxylic acids and ketones are prepared in a form which is subject to easy purification. The solvent should boil at a temperature sufficiently different from that of the products to allow easy separation by distillation.

Where it is possible to form the ester of the omega-halogen-substituted carboxylic acid, the solvent used may be an alcohol, as before defined, whereby the esterification of the acid proceeds as it is formed in the reaction, assuming the sulfenyl halide does not react with the alcohol. The alcohols useful for this purpose include alkanols having alkyl groups ($R^3$ in the formulas) containing from 1 to 6 carbon atoms. In situ esterification at the low temperatures employed is too slow or does not take place if higher molecular weight alcohols are used. The acohols may include methyl alcohol, ethyl alcohol, propyl alcohol, isopropyl alcohol, butyl alcohol, secondary butyl alcohol, tertiary butyl alcohol, amyl alcohol, isoamyl alcohol and hexyl alcohol. The amount of solvent used varies, assuming it does not enter into the reaction as an esterifying agent. In general, about 50% to 400% by volume based on the amount of total reactant volume may be used. Where the lower molecular weight alcohols are used, i.e., those which act to esterify the acids produced, a large excess over the stoichiometric requirements for the esterification should be used. The excess should be greater than 100%. For example, we have used an excess of 19 moles without interfering with the speed of the reaction.

The acidifying medium may be any organic or inorganic acid strong enough, or as are known to act, to provide reduction-oxidation conditions. The reaction may be carried out with sulfuric acid, hydrochloric acid, or acetic acid, for example. A sufficient amount of the acidifying medium should be used to supply at least one equivalent of a divalent reducing ion per equivalent of peroxide reactant. In general, the amount of acidifying medium used will vary from about 50 to 150 percent per mole of peroxide reactant present. In turn, since 2 mol equivalents of the free radical produced in the first stage of the reaction, as seen from the examples herein, reacts with 2 mol equivalents of the sulfenyl halide, the latter constituent should be present in at least an equivalent amount as compared with the original peroxide reactant. An excess of 10 to 30 mol percent of sulfenyl halide is preferred. Temperature control, especially in the range from 10° C. to 40° C., is accomplished by the use of a cooling jacket or cooling coils through which a refrigerant is circulated. An ice or ice-salt bath may be used provided the reaction mixture is thoroughly agitated.

Recovery of the products is simplified by their thermal stability, difference in boiling points, and solubilities. Simple addition of water brings about a phase separation, with the products being in the lower organic phase, which can be separated by decantation, water-washed, and dried over calcium chloride. Distillation in stages may precede the drying step or follow it. The first product usually recovered by the distillation is the omega-halogen-substituted acid, ester or ketone, as the case may be, and further distillation of the residue yields the disulfide. Some of the disulfides may crystallize out of solution and can be collected by filtration rather than by distillation. The distillation step may be carried out using any of the known techniques available in the art. No further description of the method of purification is deemed necessary for these reasons.

In general, in carrying out the reaction the mixture of the peroxide compound and alcohol, or other solvent mixture, is first prepared and cooled to a temperature of about —40° C. to 40° C., preferably to a temperature of —25° C. to 10° C. Following this, the sulfenyl halide is added slowly with stirring. The mixture is blanketed with an inert atmosphere, such as nitrogen gas, and a solution containing a reducing salt of a heavy metal and sulfuric acid in distilled water is added gradually to the reaction mixture over a period of about 5 minutes to 3 hours. Upon completion of the addition of the heavy metal salt solution, the mixture is diluted with distilled water and the organic phase that separates is collected. The organic phase may be purified by any of the methods known in organic syntheses. One method is to wash the material with water and dry it over a dehydrating agent, followed by filtration and distillation. The distillation effects the separation of the disulfide and the omega-halogen-substituted acids, ester, or related ketone.

ILLUSTRATIVE EXAMPLES

The invention will be illustrated by the use of the ferrous ion, but is not to be limited thereby. For purposes of safety, when using a heavy metal ion, such as ferrous ion alone, the amount of such ion should be in excess of the amount of peroxide to be reacted. As promoters, however, the heavy metal ions may be used in trace amounts with any one of the aforementioned reducing agents, which serve to convert the ferric ion to the ferrous ion as the former is produced. Because of low cost, availability, and efficiency, the presence of ferrous ion is preferred for the reaction.

The invention is more specifically illustrated by reactions wherein cyclohexanol hydroperoxide and trichloromethanesulfenyl chloride are reacted in an aqueous methanol solution of ferrous sulfate containing a small amount of sulfuric acid. The reaction, (13)

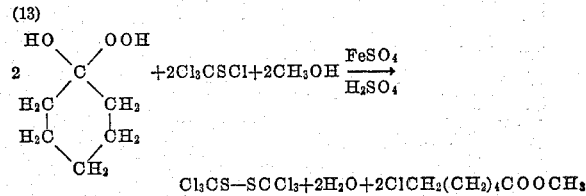

and the following reactions show in detail the theoretical steps in the reaction, that is, the ferrous salt decomposition and the free radical mechanism:

(14)

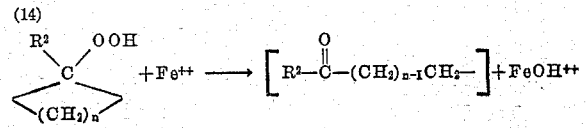

(15)

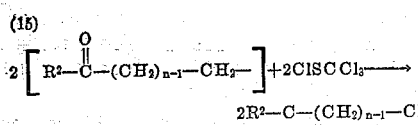

$$2R^2-C-(CH_2)_{n-1}-CH_2Cl + Cl_3CSSCCl_3$$

Reaction 13 shows the formation of perchlorodimethyl disulfide and methyl omega-chlorocaproate in accordance with specific Example I infra. Reactions 14 and 15 illustrate the formation of perchlorodimethyl disulfide and an alkyl-omega-chloroalkyl-ketone. The $(CH_2)_n$ takes the place of the R group in Formula 1 and 11, wherein $n$ may have a value of 3 to 7.

*Example I*

Cyclohexanone peroxide (0.49 mole) in 750 cc. of methyl alcohol was cooled to $-15°$ C., and 93 gm. of trichloromethanesulfenyl chloride were added with stirring. The system was then blanketed with nitrogen and a solution containing 147 gms. (0.53 mole) of ferrous sulfate heptahydrate, 25 cc. of sulfuric acid and 250 cc. of distilled water was added drop-wise to the reaction mixture over a period of 1½ hours. Midway during the ferrous salt addition, another 30 gm. of trichloromethanesulfenyl chloride was added. After the addition of ferrous salt solution was completed, the mixture was diluted with 1100 cc. of distilled water, and the organic phase was collected. This material was washed three times with 50 cc. portions of water, and then dried over $CaCl_2$. The dried product was then filtered and distilled through an 18-inch Fenske column. As by-product, 31.7 gm. of methyl omega-chlorocaproate was collected at 56° C. under 0.6 mm. pressure. Yield based on cyclohexanone peroxide was 39.3%.

The structure of this product was confirmed by its conversion to a dibasic acid by replacement of the chlorine with the cyano group, and subsequent hydrolysis. The melting point, and the mixed melting point with a known sample of pimelic acid, showed this product to be identical with pimelic acid, and therefore that the chloro-ester was methyl omega-chlorocaproate.

By further distilling the residue left from the first distillation, using a 6-inch Vigreaux column, 50.8 gm. of crude perchlorodimethyl disulfide was collected at 58 to 60° C., under 0.08 mm. pressure to prevent its decomposition. The yield based on cyclohexanone peroxide was 69.5%.

*Analysis.*—Theoretical for $C_2Cl_6S_2$: Cl, 71%; S, 21.2%; mol. wt., 301. Found: Cl, 66.1%; S, 20.6%; mol. wt., 290.

Literature value for refractive index is $n^{20}_4 = 1.5926$, and specific gravity is $d^{20}_4 = 1.7760$.

Determined value for refractive index is $n^{20}_4 = 1.5871$, and specific gravity is $d^{20}_4 = 1.7263$.

*Example II*

A solution containing 37 gm. of 2-nitrobenzenesulfenyl chloride and 22.5 gms. (0.17 mole) of cyclohexanone peroxide in 200 cc. ether was added with stirring to a solution containing 50 gm. of powdered ferrous sulfate heptahydrate, 7 cc. of concentrated sulfuric acid, and 75 cc. of methyl alcohol, all at a temperature of $-20°$ C. Addition time was 10 minutes, stirring was continued for 15 minutes, and the mixture was then diluted with 100 cc. of distilled water. Crude solid di(2-nitro-phenyl) disulfide was separated by filtration.

The filtrate was evaporated over a steambath to remove ether, and the residue was mixed with 75 cc. of methyl alcohol and 2 gm. of p-toluene sulfonic acid as catalyst and refluxed for 18 hours. On cooling, more crude di(2-nitrophenyl) disulfide was collected on a Buchner filter. The crude di(2-nitrophenyl) disulfide was recrystallized from benzene. Yield of recrystallized disulfide was 25% based on cyclohexanone peroxide.

The filtrate was diluted with 100 cc. of distilled water and extracted with benzene. The combined benzene extractions were water-washed, and the benzene was then removed under vacuum. The methyl omega-chlorocaproate was collected by distillation through a 12-inch Vigreaux column at 50° C. under 0.4 mm. pressure. Yield based on cyclohexanone peroxide was 19.6%.

*Example III*

Perchlorodimethyl disulfide can be prepared from 1-methylcyclopentyl-1-hydroperoxide and trichloromethanesulfenyl chloride in the following manner. To an aqueous alcoholic solution of 1 mole of ferrous sulfate, 50 cc. of concentrated sulfuric acid, and 1 mole of trichloromethanesulfenyl chloride is gradually added an alcoholic solution of 0.94 mole of 1-methylcyclopentyl-1-hydroperoxide at 0° C. Dilution of the reaction mixture with water gives lower organic phase which is separated and distilled to recover perchlorodimethyl disulfide and 6-chloro-2-hexanone as separate distillates.

Many of the peroxide reactants used herein are quite stable under ordinary conditions, and no special precautions are necessary in handling them on a laboratory scale or commercial basis. Because of the generally greater stability of the hydroperoxides, and peroxides, disclosed herein under ordinary conditions of handling for purposes of this invention, those species enumerated are preferred, particularly those having hydrocarbon radicals containing at least 4 carbon atoms in a condensed cyclic structure. Peroxides containing other configurations, such as the naphthene and unsaturated naphthene hydroperoxides and peroxides, for example, t-butyl 1-methylcyclohexyl-1 peroxide, 1-methyl-3-methylene cyclopentyl-2 hydroperoxide, 2,3-dimethyl cyclopentyl-3 hydroperoxide, methyl cyclopentyl-6 peroxide, and methyl 1-isopropyl-4-methylcyclohexenyl-3 peroxide, may also be used as starting materials. These compounds are known and described in United States Patent 2,581,163 by Richmond T. Bell.

As is apparent from the foregoing description of the invention, numerous modifications and variations are made self-evident to one skilled in the art and the only limitations attaching to the invention appear in the anpended claims.

What is claimed is:

1. The method of preparing organic disulfides of the general formula $R^1-S-S-R^1$ and omega-halogen-substituted compounds of the general formula,

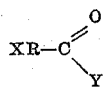

by reacting alicyclic peroxides of the general formula,

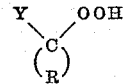

with sulfenyl halides of the general formula, $R^1SX$, wherein in the above formulas R is a divalent alkylene radical having as its essential part a chain of 3 to 7 carbon atoms, $R^1$ is a substituent free of non-benzenoid unsaturation selected from the group of hydrocarbon radicals containing 1 to 14 carbon atoms, nitro-, chloro-, bromo-, and fluoro-substituted hydrocarbon radicals containing 1 to 14 carbon atoms and the anthraquinonyl group, said halogen substituents having a replacement activity not greater than that of X, X is a halogen selected from the group of bromine, chlorine and iodine, Y is a substituent selected from the group of the hydroxyl group, alkyl radicals containing from 1 to 6 carbon atoms and alkoxy radicals containing 1 to 6 carbon atoms, conducting the reaction of said hydroperoxides and said sulfenyl halides under reduction-oxidation conditions at a temperature not above about 40° C. and separating reaction products from the mixture.

2. The method in accordance with claim 1 in which

R of said peroxide reactant is a divalent alkylene radical having as its essential part a chain of 5 to 6 carbon atoms.

3. The method in accordance with claim 1 in which said peroxide reactant is selected from the group of 1-methylcyclopentyl-1-hydroperoxide, 1-methylcyclohexyl-1-hydroperoxide, 1-methylcycloheptyl-1-hydroperoxide, 1-ethylcyclopentyl-1-hydroperoxide, 1-propylcyclopentyl-1-hydroperoxide, cyclopentanone peroxide, cyclohexanone peroxide, cycloheptanone peroxide, cyclobutanone peroxide, and 2-methylcyclobutanone peroxide.

4. The method in accordance with claim 1 in which Y is an alkyl group containing 1 to 6 carbon atoms and said omega-halo-substituted compound is an omega-halo-substituted ketone.

5. The method in accordance with claim 1 in which Y is an alkoxy group containing 1 to 6 carbon atoms and said omega-halo-substituted compound is an omega-halo-substituted ester.

6. The method in accordance with claim 1 in which Y is the hydroxy group and said omega-halo-substituted compound is an omega-halo-substituted acid.

7. The method which comprises reacting cyclohexanone peroxide and trichloromethane sulfenyl chloride under reduction-oxidation conditions in the presence of an alkanol containing 1 to 6 carbon atoms at a temperature not above about 40° C. and separating the corresponding alkyl ester of omega-chlorocaproic acid and perchlorodimethyl disulfide from the reaction mixture.

8. The method which comprises reacting cyclohexanone peroxide and 2-nitrobenzene sulfenyl chloride under reduction-oxidation conditions in the presence of an alkanol containing 1 to 6 carbon atoms at a temperature not above about 40° C. and separating the corresponding ester of omega-chlorocaproic acid and di(2-nitrophenyl) disulfide from the reaction mixture.

9. The method which comprises reacting 1-methylcyclopentyl-1-hydroperoxide and trichloromethanesulfenyl chloride under reduction-oxidation conditions at a temperature not above about 40° C. and separating 6-chloro-2-hexanone and perchlorodimethyl disulfide from the reaction mixture.

10. The method in accordance with claim 1 in which said alicyclic peroxide is a cycloalkanolhydroperoxide, in which Y of said formula is a hydroxyl group, said sulfenyl halide is a perhaloalkanesulfenyl chloride, said reaction is conducted under reduction-oxidation conditions at a temperature of between about −40° C. and 40° C. at atmospheric pressure and a perhalodialkyl disulfide and an omega-chloro-substituted aliphatic carboxylic acid are separated as products.

11. The method in accordance with claim 1 in which said alicyclic peroxide is an alkoxy-cycloalkane hydroperoxide in which Y of said formula is an alkoxy group, said sulfenyl halide is a perhaloalkane sulfenyl chloride, said reaction is conducted under reduction-oxidation conditions at a temperature of between about −40° C. and 40° C., and a perhalodialkyl disulfide and an omega-chloro-substituted aliphatic ester are separated as products.

12. The method in accordance with claim 1 in which said alicyclic peroxide is an alkyl-cycloalkane peroxide in which Y of said formula is an alkyl group, said sulfenyl halide is a perhaloalkane sulfenyl chloride, said reaction is conducted under reduction-oxidation conditions at a temperature of between about −40° C. and 40° C., and a perhalodialkyl disulfide and an omega-chloro-substituted aliphatic ketone are separated as products.

13. The method which comprises reacting cyclohexanone peroxide and trichloromethane sulfenyl chloride under reduction-oxidation conditions in the presence of methyl alcohol at a temperature not above about 40° C. and separating methyl omega-chlorocaproate and perchlorodimethyl disulfide from the reaction mixture.

14. The method which comprises reacting cyclohexanone peroxide and 2-nitrobenzene sulfenyl chloride under reduction-oxidation conditions in the presence of methyl alcohol at a temperature not above about 40° C. and separating methyl omega-chloro-caproate and di(2-nitrophenyl) disulfide from the reaction mixture.

15. The method in accordance with claim 1 in which Y in said reactant alicyclic peroxide is a hydroxyl group, said reaction is conducted in the presence of an alkanol containing 1 to 6 carbon atoms and said omega-halogen-substituted compounds are separated as esters corresponding to said alkanol.

No references cited.